United States Patent
Verdigets et al.

[19]

[11] Patent Number: 5,904,241
[45] Date of Patent: May 18, 1999

[54] SHUTTLE PLUGS FOR RETAINING HEADLESS PIVOT RODS IN CONVEYOR BELTS

[75] Inventors: Christopher J. Verdigets, Metairie; James O. Gundlach, New Orleans, both of La.

[73] Assignee: The Laitram Corporation, Harahan, La.

[21] Appl. No.: 08/708,753

[22] Filed: Sep. 5, 1996

[51] Int. Cl.⁶ .................................................. B65G 17/06
[52] U.S. Cl. ............................................................ 198/853
[58] Field of Search ............................................ 198/853

[56] References Cited

U.S. PATENT DOCUMENTS

| | | | |
|---|---|---|---|
| 4,709,807 | 12/1987 | Poerink | 198/853 |
| 4,893,710 | 1/1990 | Bailey et al. | 198/853 |
| 4,953,693 | 9/1990 | Draebel | 198/853 |
| 5,024,321 | 6/1991 | Lapeyre | 198/853 |
| 5,096,053 | 3/1992 | Hodlewsky | 198/853 |
| 5,217,110 | 6/1993 | Spangler et al. | 198/852 |
| 5,247,789 | 9/1993 | Abbestam et al. | 198/851 X |
| 5,293,989 | 3/1994 | Garbagnati | 198/853 |
| 5,305,869 | 4/1994 | Damkjaer | 198/853 X |
| 5,335,768 | 8/1994 | Schladweiler | 198/853 |
| 5,435,435 | 7/1995 | Chiba et al. | 198/853 |
| 5,482,156 | 1/1996 | Damkjaer | 198/853 |

*Primary Examiner*—James R. Bidwell
*Attorney, Agent, or Firm*—Laurence R. Brown

[57] ABSTRACT

A modular link of a conveyor belt is provided with belt edge structure for retaining in the belt so that it may not escape or protrude from a belt edge a headless pivot rod journalled in apertures in interdigitated link ends interconnecting adjacent links. The retention structure provides a shuttling plug movable into two bistable positions within a mating shuttle cavity having an open end and a blind end. The cavity extends transversely in the link between two link end pivot rod journalling apertures to intersect only one journalling aperture. The two bistable states for the shuttle plug respectively (1) lock the headless pivot rod in place in a stable pivot rod occluding position extending into said journalling aperture, and (2) permits the headless pivot rod to enter or leave the journalled position by movement of the shuttle plug out of the occluding position into a second stable position. The belt edge structure provides an adjoining link with a cavity closure surface which confines the open end of the mating shuttle cavity to occlude movement of the plug out of the mating shuttle cavity when the conveyor belt is operating.

17 Claims, 5 Drawing Sheets

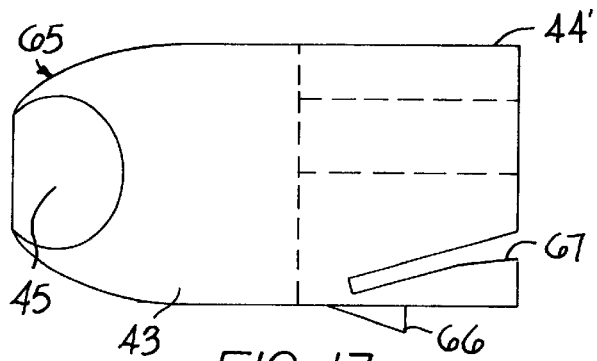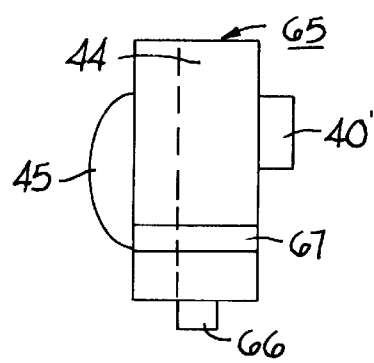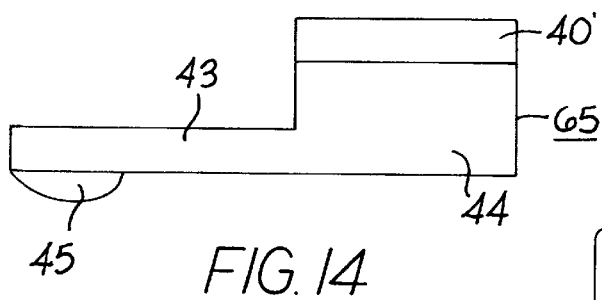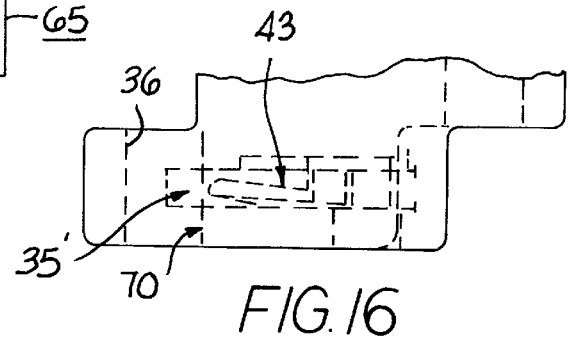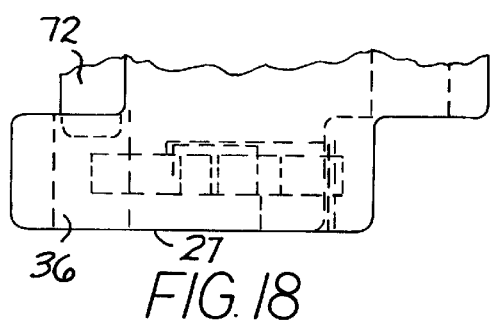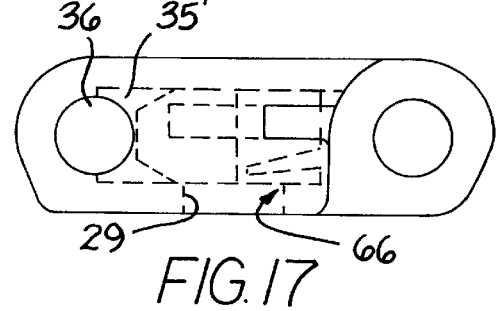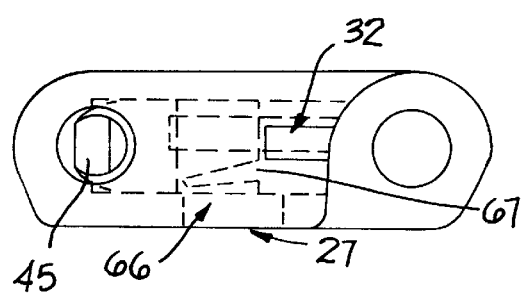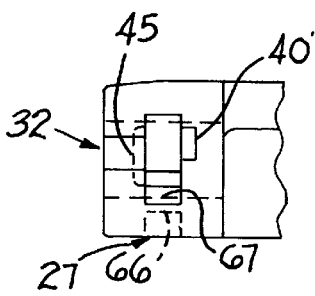

SHUTTLE PLUGS FOR RETAINING HEADLESS PIVOT RODS IN CONVEYOR BELTS

TECHNICAL FIELD

This invention relates to the retention of headless pivot rods in conveyor belts, and more particularly it relates to conveyor belts using removable plugs or stops for retaining the pivot rods in place during operation of the conveyor belts.

BACKGROUND ART

Typical art disclosing modular link belts with removable plugs or clips that occlude headless pivot rods journalled in module link end apertures comprise the following U.S. Pat. Nos.: 4,709,807 to N. J. Poerink, Dec. 1, 1987; 5,024,321 to J. M. Lapeyre, Jun. 18, 1991; 5,096,053 to W. G. Hodlewsky, Mar. 17, 1992; 5,217,110 to M. L. Spangler, et al., Jun. 8, 1993; 5,247,789 to G. Abbestam, et al., Sept. 28, 1993; 5,293,989 to C. Garbagnati, Mar. 15, 1994; 5,305,869 to P. E. Damkjaer, Apr. 26, 1994; 5,335,768 to T. J. Schladweiler, Aug. 9, 1994; and 5,435,435 to H. Chiba, et al., Jul. 25, 1995.

All of these have the common problem and deficiency in that the plugs, clips and the like, which hold the pivot rods in place, can work themselves loose under working conditions encountered in the operation of a conveyor belt. This catastrophically results in rods migrating out of the belts, causing total or partial breakage and possible contamination of carried products or fouling of the equipment. This problem is particularly evident in plastic belts with modular links that have some resiliency and which inherently have slick surfaces. Conditions that lead to such failures are particularly apt to be encountered in operation conditions, such as: regions of vibration, changing load weight patterns, regions of heavy or rapidly varying belt tension, and possible physical interfering items that may extend into the path of the belt, particularly at the belt edges.

It is the objective of this invention to solve that problem and to introduce improved novel structure for more reliably retaining headless pivot rods in place during the working life of conveyor belts with little likelihood of catastrophic failure or loss of plugs during normal belt working conditions.

DISCLOSURE OF THE INVENTION

This invention therefore provides movable plugs or tabs retained in confining mating cavities extending within belt edge structure provided on modular links. These plugs shuttle between two bistable positions within the mating cavities respectively occluding headless pivot rods in place in their journalling interdigitated link end apertures and freeing the pivot rods for entry and exit from their resident journalled position.

The confining mating cavities are directed transversely from one link end toward the opposite link end within the belt edge structure to intercept only one link pivot rod journalling aperture in a manner producing one blind cavity end. The plugs that shuttle in those cavities have detenting structure to hold them in two bistable positions within the cavities. The plugs are further confined by blocking the single shuttle cavity opening to prevent plug removal by way of belt edge structure of an adjacent modular link. Thus the plugs are retained in the cavity during normal dynamic belt operation and cannot escape, unless the belt is broken or knowingly disassembled.

Other objects, features and advantages of the invention will be found throughout the following description, claims and accompanying drawings.

BRIEF DESCRIPTION OF THE DRAWINGS:

In the accompanying drawings, where like reference characters represent similar features throughout the various views to facilitate comparison:

FIGS. 13, 14 and 15 are respectively plan, side elevation and right end views of a further shuttle plug embodiment of the invention, FIG. 16 is a fragmental elevation view of a modular link showing in phantom lines the internal shuttle plug disposed in one bistable position for inserting or removing pivot rods, FIG. 17 is a bottom view of the modular link of FIG. 16 showing in dotted lines the internal shuttle plug, FIG. 18 is a fragmental elevation view of the modular link of FIG. 16 showing in dotted lines the internal shuttle plug disposed in its other bistable position for occluding pivot rods, FIG. 19 is a bottom view of FIG. 18, FIG. 20 is a fragmental end view of FIG. 19 looking in at the belt edge fragment from the right.

THE PREFERRED EMBODIMENTS

Figure 1:
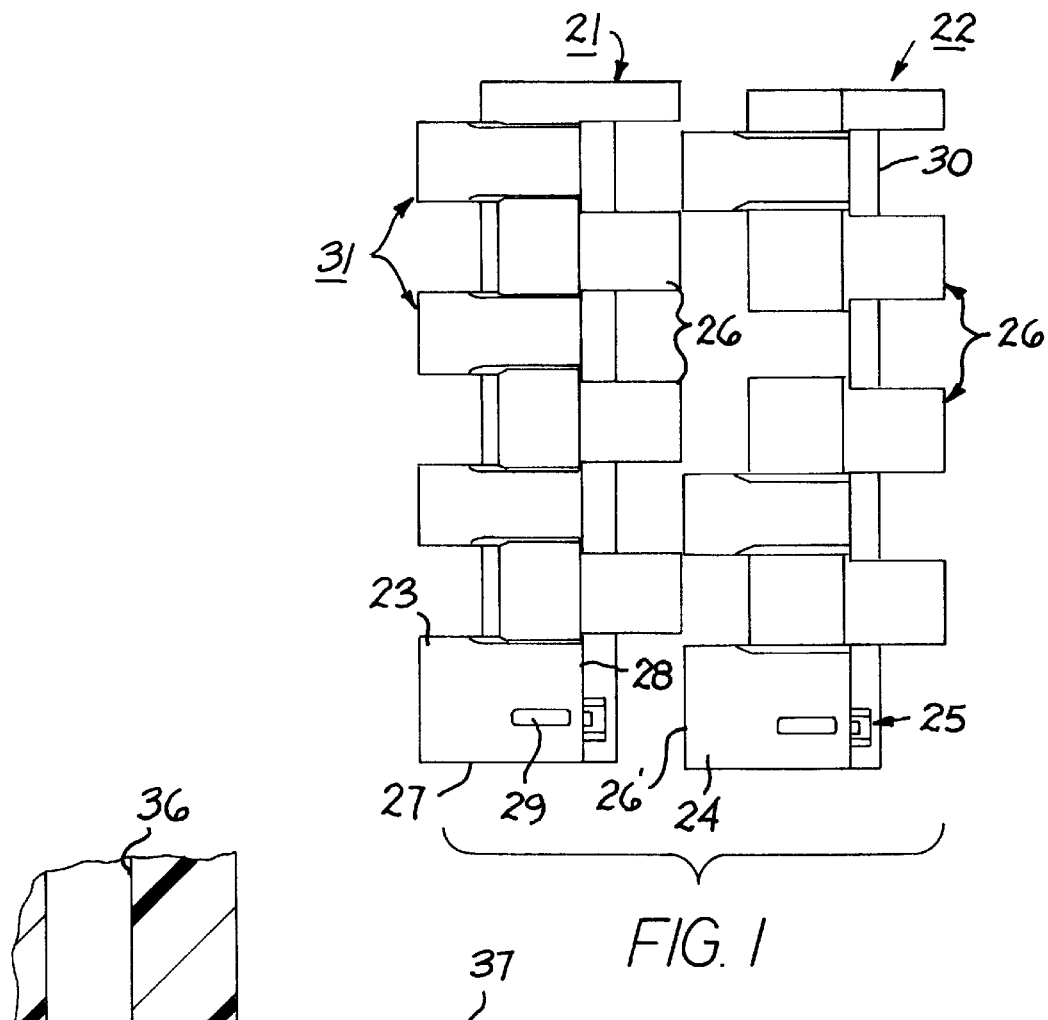
FIG. 1 is an exploded rear elevation view of two adjacent modular links of a conveyor belt embodying the link edge structure of this invention.

As seen in FIG. 1, two adjacent modular links 21, 22 of a conveyor belt are shown in side-by-side relationship. The belt edge structure 23, 24 shown at the bottom of the respective links has an internal lateral cavity in which the shuttle plug 25 slides. This shuttle plug 25 laterally slides within the internal cavity into two bistable positions. Thus in one position a headless pivot rod (not shown) journalled in apertures of interdigitated link ends 26 is retained in the belt in one bistable position of the shuttle plug 25 so that the pivot rod cannot work its way out of the belt edge under normal operating conditions. In the other stable position, the pivot rod may be inserted or removed from the journalling apertures through the edge 27 of the belt without obstruction by the plug 25. It is noted that the shuttle plug mating internal cavity of the link end structure has an open access end on the right and an internal blind closed end on the left.

To resolve the problem of losing a plug that can cause rods to migrate axially and to contaminate goods carried by the conveyor belt or foul the machinery, the rounded ends of the link ends or fingers 23, 24, when the modules 21, 22 are interconnected by a pivot rod serve to abut the open access end of the internal cavity to block the shuttle plugs 25 from escaping from the blind open ended internal cavity. That cavity runs transversely within the modular link edge structure 23, 24 from one extremity overlapping the pivot rod journalling apertures on the left hand side of the links 21, 22 and terminating at the right hand edges 28, etc. of the link end structure, which is confronted by the left nose ends 26', etc. of the link ends 23, 24.

Figure 3:
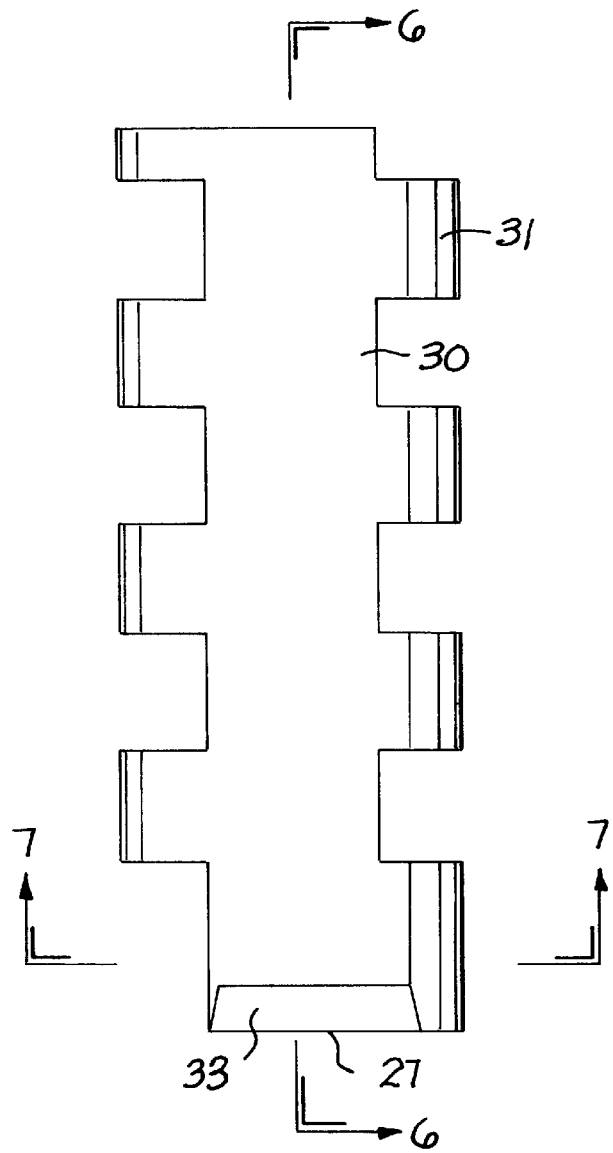
FIG. 3 is a front elevation view of one of the modular links of FIG. 1.
Figure 4:
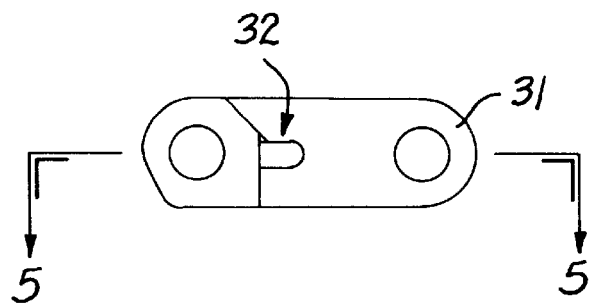
FIG. 4 is a bottom view of the modular link of FIG. 3.
Figure 9:
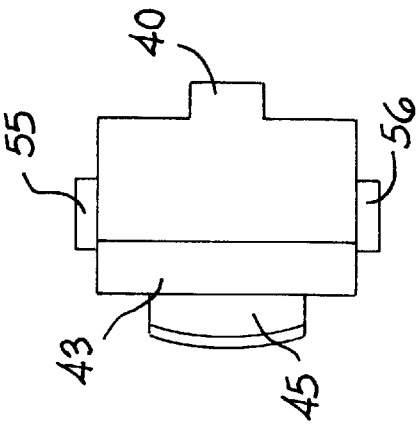
FIG. 9 is a side elevation view of the shuttle plug of FIG. 8.
Figure 12:
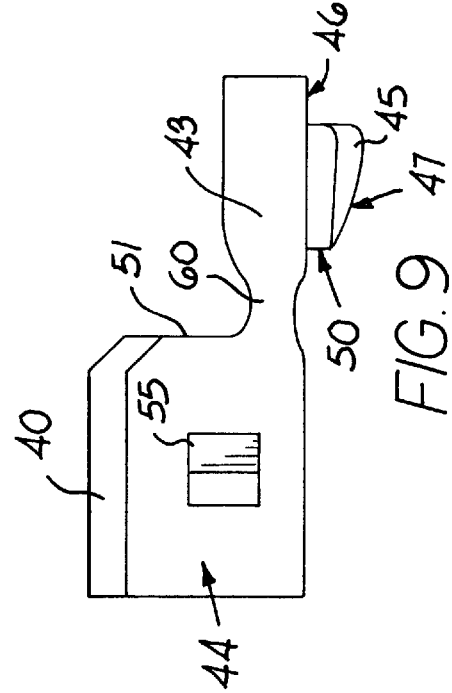
FIG. 12 is an end view looking into FIG. 10 from the right.
Figure 8:
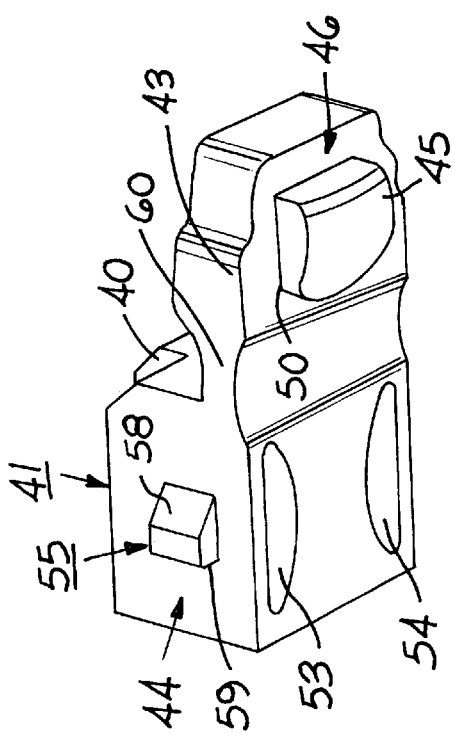
FIG. 8 is a perspective view of one shuttle plug embodiment of this invention.
Figure 10:
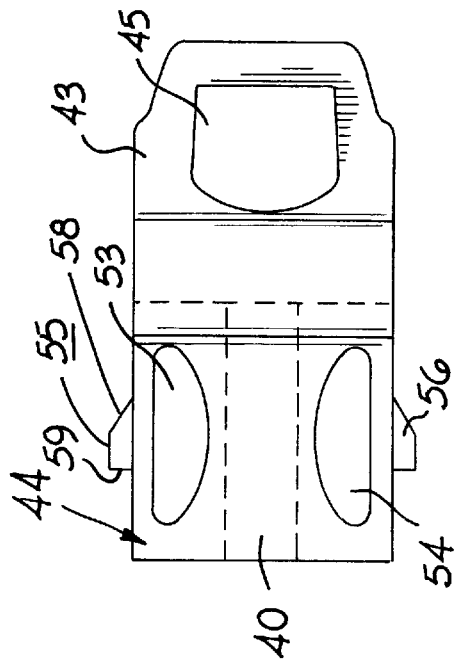
FIG. 10 is a plan view looking into the bottom of FIG. 9.

The slot 32 of FIG. 4 extending through the edge of the belt into the shuttle cavity permits entry of a tool, such as a screw driver for forcing the shuttle plug toward a detented pivot rod retaining locked-in position. The slot 29 through the outer shell extending into the internal mating cavity in which the shuttle plugs 25 slide, will also admit a tool, such as a screw driver or a blade, that could be used to remove a shuttle plug from an elastically biased and locked-in position within the internal cavity. The flanges 30 on the modules 21, 22 abut the rounded noses 26 of the link ends 31, serving to form a substantially uninterrupted flat planar load bearing surface as seen in FIG. 3. There is a tapered conveying surface edge 33 terminating at the belt edge 27.

Figure 5:
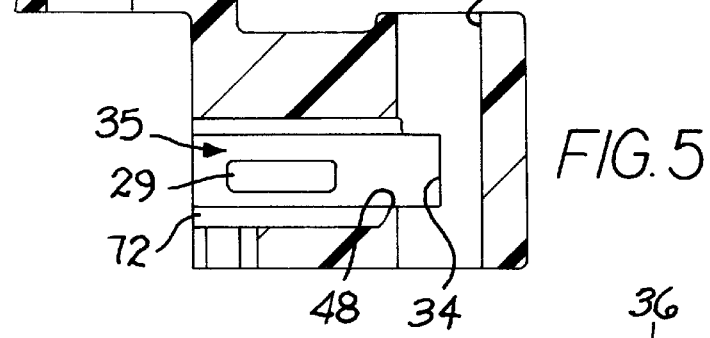
FIG. 5 is a fragmental view, partly in section along the section lines 5—5 of FIG. 4, looking at the link edge portion of the modular link.
Figure 11:
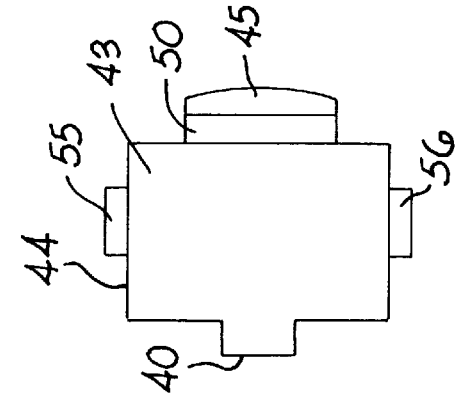
FIG. 11 is an end view looking into FIG. 10 from the left.

In FIG. 5, the section view shows the internal layout of the shuttle cavity 35 transversely disposed between the link end apertures 36, 37 in which the pivot rods are journalled. The shuttle cavity 35 has a blind inner end 34 that extends into the pivot rod journalling aperture 37. The cross section shape of the cavity 35 is substantially rectangular (FIG. 6) with a keyway 39 outwardly extending for receiving in mating plug body sliding contact the plug profile 44 with key 40 (FIG. 11). Two other grooves 62 and 72 outwardly extending from the cavity 35 provide clearance for other appendages of the plug 25. The groove 72 opposite the keyway 39 terminates just before the pivot rod aperture 37. A short portion of a cavity wall surface 48 is disposed between the groove 72 and the aperture 37.

Figure 7:
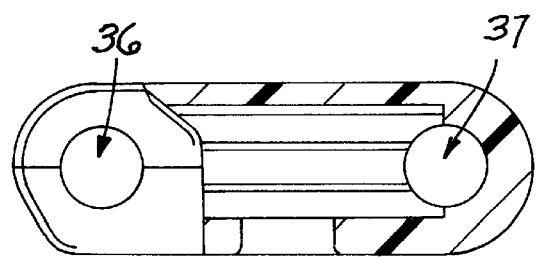
FIG. 7 is a bottom view, partly in section, looking into the lines 7—7 of FIG. 3.

One embodiment 41 of the shuttle plug, which mates into and slides within the shuttle cavity is shown in FIGS. 8 to 12 in an enlarged scale. A detent 45 carrying flexible arm 43 integrally extends through a thinner intermediate region 60 from the body portion 44 of the shuttle plug 41, as provided from the hard but flexible plastic material from which the plug is molded. The substantially rectangular body portion 44 snugly fits within the mating shuttle cavity (35, FIG. 6) to shuttle back and forth therein between the two bistable working positions of plug 41. In the pivot rod occluding stable position the detent 45 enters and locks into a pivot rod journalling aperture (37, FIG. 7) to retain the detent therein as an occluding plug in a locked-in stable resident position.

The sloped or tapered surface 47 on detent plug 45 expedites the movement of the detent plug 45 into its occlusion position, as the flexible arm 43 is flexed by engagement with the cavity wall surface 48 between the groove 72 and the aperture 37 and opposite to the keyway 39 (FIG. 6) in which the shuttle plug key 49 moves. The cylindrical-like wall 50 about the detent plug 45 serves to lock the detent plug into its mating pivot rod journalling nest in pivot rod aperture 37 (FIG. 7) by means of the resilient bias of the flexible arm 43.

The detent 45 may be overcome and removed from its locked-in position when the shuttle plug is to be moved into its other stable position to remove a pivot rod. Thus, the flexible arm 43 is flexed by an instrument, such as a screw driver, entering the pivot rod journalling aperture (37) from the edge of the belt to force the occluding plug out of its detent position. Typically a screw driver tip engages the detent 45 at the ridge formed at the intersection of tab 46 and the flat face of the detent plug 45 so that the shuttle plug may be forced laterally back into the exit cavity simultaneously as it is flexed out of its detented state by way of the screwdriver tip.

The body portion of the shuttle plug is apertured at 53, 54 to provide resiliency for compressing one of the extending adjacent detent stops 55, 56 when it enters the mating shuttle cavity 38 of a modular link 21, 22 and frictionally contacts the cavity wall 57. The entry surface 58 of the detent stops 55, 56 are tapered and the stop surfaces 59 rise normally from the shuttle body surface. This detent stop rides in the slot 29 (FIG. 5) and abuts the stop surface 59 to prevent removal of the shuttle plug from the mating shuttle cavity 38. The slot 29 further provides an entry point for inserting a screw driver tip, a blade, or the like, thereinto to pare down or remove the detent stop 56 so that the shuttle plug 41 can be removed from the shuttle cavity 38. The plug 41 can be removed from a resident position in the modular link 21 or 22 only when disassembling the belt because of the presence of an adjacent link end 26' in the manner aforesaid.

Figure 6:
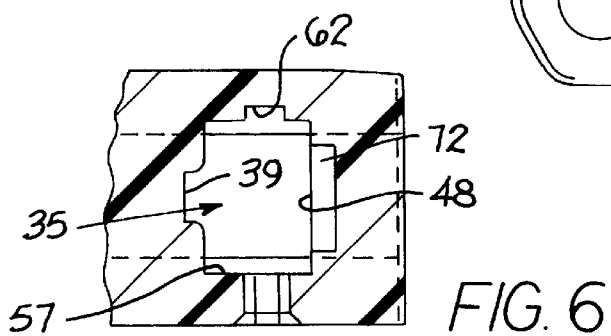
FIG. 6 is a fragmental view, partly in section, looking along lines 6—6 of FIG. 3 into the link edge portion of the modular link.
Figure 2:
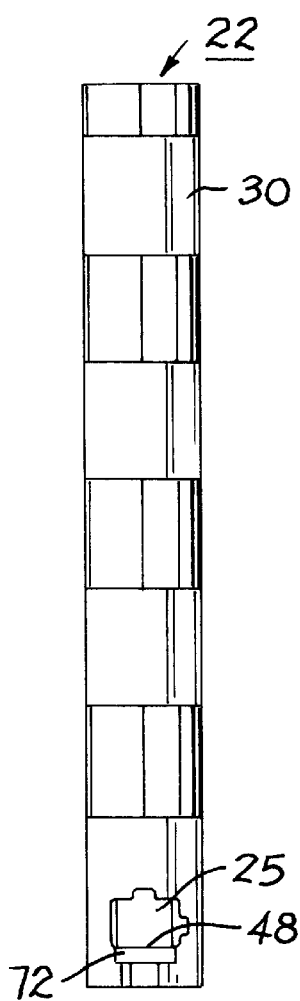
FIG. 2 is an elevation view of the modular link, looking into the right of FIG. 1 at the end of the shuttle plug.

Only one of the detent stops 55, 56 is used and its opposite mate rides freely in the keyway-like channel 62 extending along the shuttle cavity 38 as shown in FIG. 6. Thus the plugs are reversible for universal use in either right or left hand versions of the modular links. Groove 72 provides clearance for the detent plug 45 when it is in the non-occluding position. This allows edge modules to be stored, such as in stock, with plugs 41 installed in the ready-to-assemble non-occluding position without subjecting the arms 43 to a continuous bending force for an extended period.

As shown in FIGS. 13 to 15, a second shuttle plug embodiment 65 has provision for a single similar flexibly movable detent stop member 66. This shuttle plug functions in a similar way, and has corresponding features including the occlusion detent member 45 riding upon the flexible arm 43 integrally affixed to the body portion 44'. The mating detent key ridge 40' however is off center to balance the spring slot 67 that renders flexibility and biasing action to overcome a locked-in stop 66.

FIGS. 16 to 20 show in phantom the internal plug 65 in its bistable working positions within cavity 35' of the corresponding link end structure of a retaining modular conveyor belt link. These working positions are similar to those of the before described plug-shuttle cavity embodiment 41, 35. Thus FIGS. 16 and 17 show the internal plug in its stable position with the pivot rod journalling aperture open to insert or remove a pivot rod. FIGS. 18 and 19 show the shuttle plug in its occlusion state stable position for retaining the pivot rod within the conveyor belt.

In the shuttle plug side view of FIG. 16 therefore, the flexible arm 43 is flexed by contact of the detent 45 with the edge 70 of the journalling aperture 36 as the shuttle plug moves toward the right out of the pivot rod occlusion position blocking the pivot rod journalling aperture 36. From the shuttle plug plan view of FIG. 17 it is seen that the stop member 66 reaches the end of slot 29 and retains the shuttle plug in place so that it cannot escape from the open right hand end of the shuttle cavity 35', that is also occluded by the position of an adjacent module link end as aforesaid.

As seen from the side view of the shuttle plug in FIG. 18, the resiliency of the flexible arm 43 seats and locks the detent stop 45 into the pivot pin journalling aperture 36 where it occludes the removal of the headless pivot pin 72 (downwardly) from the edge of the belt 27. Any axial motion toward the shuttle plug 41 or growth in length of the pivot rod cannot push the locked in plug out of the journalling aperture 36. In both the plan view of the shuttle plug in FIG. 19, and the end view of the shuttle plug in FIG. 20, the slot 32 in the edge of the belt (also shown in FIG. 4) permits the force the tip of a screwdriver to be inserted to force the shuttle plug into the occlusion position. Similarly the slot 29 may be used to push against the body portion of the shuttle plug.

Figure 21:
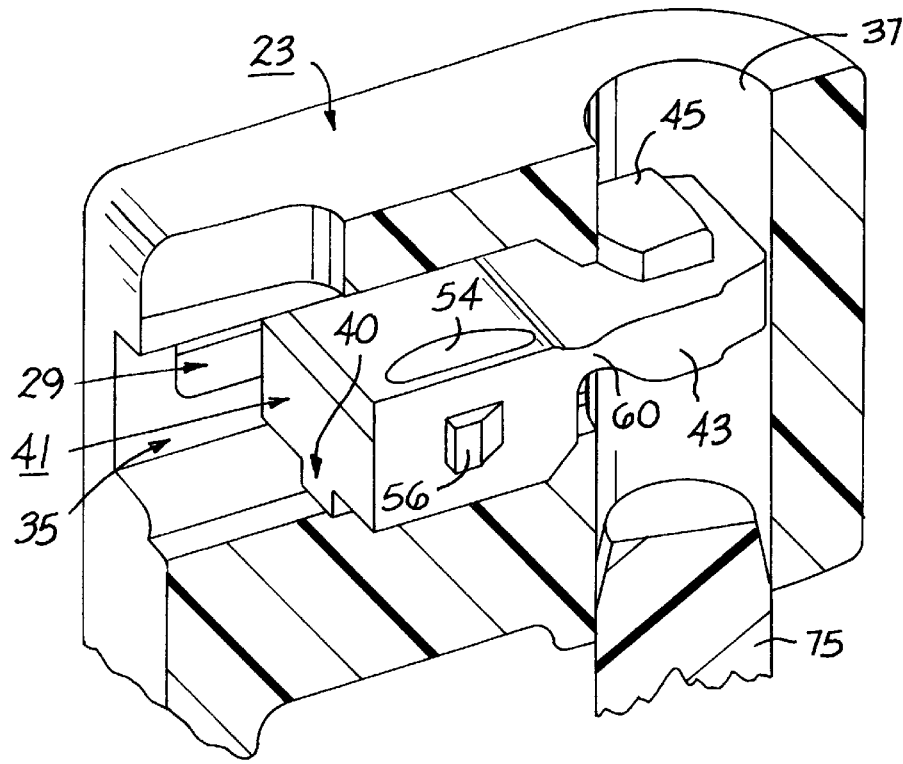
FIG. 21 is a perspective cut away view showing the shuttle plug in the bistable position occluding a pivot rod.

As seen from FIG. 21, the shuttle plug 41 is in its bistable pivot rod (25) occluding position inside the shuttle cavity 35 within link end 23 with the detent 45 lodged in the pivot rod aperture 37. Thus, the shuttle plug 41 cannot move outwardly (to the left), and serves to occlude the pivot rod 75.

Figure 22:
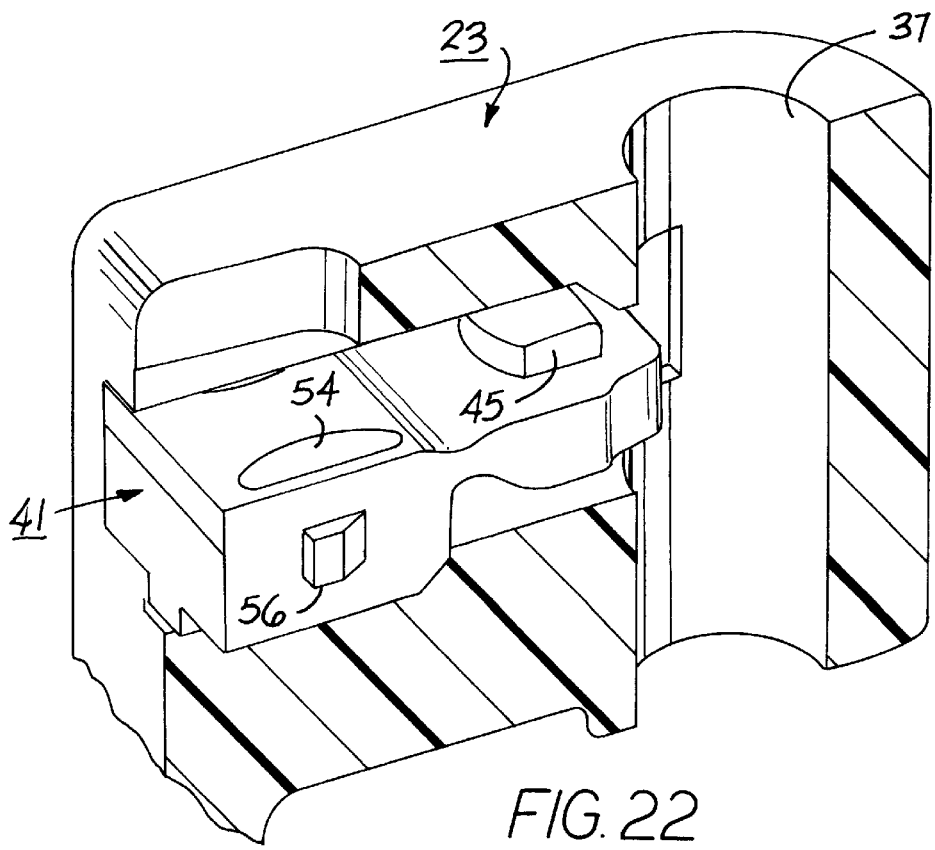
FIG. 22 is a perspective cut away view showing the shuttle plug in its bistable position permitting insertion of a pivot rod.

The other stable position of FIG. 22 permits the pivot rod to be entered or removed in the pivot rod aperture 37. The shuttle plug 41 is held in this stable position with the rear end detent stop (not shown) abutting the left end of slot 29 (FIG. 21).

It is to be recognized that other modular link configurations such as those laid in bricklaid patterns with edgeless internal modules may be constructed without departing from the invention.

Having therefore introduced new and improved apparatus and methods for preventing the inadvertent removal of a pivot rod from a belt edge or the inadvertent removal of the retaining shuttle plug member from its pivot rod occluding position as a conveyor belt operates under its usual working conditions, those features of novelty suggestive of the nature and spirit of this invention are defined with particularity in the following claims.

We claim:

1. In a conveyor belt employing headless pivot rods which are held in place by a removable plug, the improvement comprising in combination:

a plurality of conveyor belt modules having interdigitated link ends on the modules being interconnected pivotably by headless pivot rods journalled in apertures through said link ends, wherein at least one module near a belt edge contains a shuttle path cavity disposed transversely in the module in an axial direction between two journalling apertures to intercept one journalling aperture dimensioned for receiving in said axial direction into and out of said shuttle path cavity a slidable shuttle plug movable into the cavity for retention within the cavity when the modules of the belt are interconnected by journalled pivot rods, said cavity defining a pathway in said axial direction providing alternative resident plug positions that respectively retain a pivot rod in place and permit removal of the pivot rod, movable shuttle plugs mating within said shuttle path cavities to move between said alternative positions, and detent structure on the shuttle plugs for retaining the shuttle plugs stably in a locked occlusion position for retaining journalled pivot rods in place.

2. The improvement of claim 1 further comprising a plastic shuttle plug with a body portion from which a flexible arm integrally extends, said detent structure comprising an integral plug member on the flexible arm for entering a pivot rod journalling hole between an edge of the belt and a journalled pivot rod in response to deflection of said flexible arm.

3. The improvement of claim 1 further comprising a blind shuttle path cavity having an open end of said shuttle path cavity adapted for entry and removal of said shuttle plugs, and further comprising detented stop means resiliently biased into a default position for preventing exit of a shuttle plug from the shuttle path cavity open end.

4. The improvement of claim 2 wherein said integral plug member on the flexible arm further comprises a tapered surface on said detent structure adapted upon movement of the plug to a position retaining a pivot rod in place to slide over a mating belt module detent surface in the region of a journalling aperture thereby to flex the flexible arm in a direction facilitating positioning of the plug in the journalling apertures.

5. The improvement of claim 1 wherein the detent structure defines a tool receiving surface on the shuttle plugs exposed from an edge of the belt through a said journalling aperture to thereby extend into said shuttle path cavity for overcoming the detenting structure and directing the shuttle plug into an alternative stable position in the mating shuttle cavity which permits removal of a pivot rod.

6. The improvement defined in claim 2 wherein modules have an access aperture extending into the shuttle cavity portion adapted to receive a tool entering the access aperture to deflect said flexible arm for moving the plug in the mating cavity from its position for removing the pivot rod to its position for preventing removal of the pivot rod.

7. In a conveyor belt employing headless pivot rods which are held in place by a removable shuttle plug, the improvement comprising in combination:

a plurality of conveyor belt modules having interdigitated link ends on the modules being interconnected pivotably by headless pivot rods journalled in apertures through said link ends wherein at least one module near a belt edge contains a shuttle path cavity disposed transversely in the module in a direction between two journalling apertures to intercept one journalling aperture, said cavity being dimensioned for receiving a slidable shuttle plug movable into the cavity for retention within the cavity when the modules of the belt are interconnected by journalled pivot rods, said cavity defining a pathway providing alternative resident plug positions that respectively retain a pivot rod in place and permit removal of the pivot rod, movable shuttle plugs mating within said shuttle path cavities to move between said alternative positions, detent means on the shuttle plugs for retaining the shuttle plugs stably in a locked occlusion position for retaining journalled pivot rods in place, belt modules that encompass on opposite ends a set of interdigitatable link ends forming pivot rod journalling apertures, and belt edge structure wherein said cavity and the module are so constructed that the shuttle in a belt of interconnected modules is retained within the cavity by belt edge structure on an interconnected module abutting the open end of said cavity to prevent exit of the shuttle plug therefrom.

8. A shuttle plug for occlusion of headless pivot rods in a journalled position in the apertures of two interlocked modular links of a conveyor belt without moving out of place, said movable plug being adapted to move within a mating plug journalling cavity, comprising in combination, a body portion adapted to slide into said journalling cavity, a flexible detent arm integrally affixed to the body portion carrying thereon a detenting plug portion arranged to elastically flex into a removable locked-in-place position into a journalling aperture for retaining a pivot rod in a stable resident state relative to said plug journalling cavity for occluding removal of the pivot rod.

9. The movable plug defined in claim 8 further comprising: an interlocking keying ridge on the detenting plug portion for mating into a corresponding keyway slot defined by the mating plug journalling cavity.

10. The shuttle plug defined in claim 8 further comprising: detent retaining means and accompanying resiliently biased detent structure on the body portion for engaging an entryway slot to said mating shuttle cavity as a detenting stop establishing at least one stable resident state locked within the shuttle cavity, the biased detent structure permitting forceful removal of the shuttle plugs from the shuttle cavity.

11. The shuttle plug defined in claim 8 wherein the detenting plug portion further comprises a tapered surface adapted to slide over belt module structure in the region of a journalling aperture to flex the flexible detent arm and facilitate positioning of the plug into the journalling apertures.

12. The movable plug defined in claim 8 wherein the flexible detent arm defines a tool receiving plug surface exposed from an edge of the belt through a journalling aperture for receiving a tool for removing the detenting plug portion from its locked-in-place resident state position occluding the removal of a pivot rod and moving the plug portion into an alternate shuttle cavity position in its mating cavity so that the pivot rod may be inserted or removed.

13. The method of occluding pivot rods in journalled aperture positions pivotally connecting modules of a modular conveyor belt to avoid extending from the edge of the belt, comprising the steps of: providing in a module near a belt edge a transversely disposed cavity aligned along a shuttle axis between two journalled pivot rod receiving apertures with a closed end intercepting one pivot rod journalling aperture of the module and an axially opposed open end, said cavity being structured for receiving a detentable shuttle plug axially therein for movement along said shuttle axis from a stable pivot rod occlusion position within the journalling aperture to a further stable position permitting pivot rod insertion and removal and retention structure for retaining the plug within the cavity so that it cannot become displaced and removed from said cavity under normal conditions of operating the conveyor belt.

14. The method of retaining pivot rods in journalled positions pivotally connecting modular links of a conveyor belt, comprising the steps of: providing a channel extending transversely from an open end into a link body between two link end journalling apertures to intercept one journalling aperture at an end opposite to said open end, and inserting a shuttle plug into said channel from the open end to move between respective detented positions along said channel to respectively occlude a pivot rod journalled in the link body and free the pivot rod for removal from the link body.

15. The method of claim 14 further comprising the step of, providing mating detent structure on the link body and said shuttle plug to removably lock the shuttle plug within said channel.

16. A modular link for a conveyor belt provided with edge structure for retaining a headless pivot rod journalled in apertures of interdigitated link ends of two interconnected links characterized in that a transverse blind shuttle cavity with respective closed and open ends directed along a transverse axis between two pivot rod journalling apertures passes through the edge structure and intersects with a journalling aperture at said closed end for entry and slidably mating therein of a shuttle plug movable along said axis into a locked-in-place pivot rod occluding position extending into the journalling aperture at said closed end.

17. A modular link for a conveyor belt provided with structure for retaining a headless pivot rod journalled in apertures of interdigitated link ends of two interconnected links characterized in that a transverse blind shuttle cavity with one open end directed transversely between two pivot rod journalling apertures passes through the edge structure and intersects with a journalling aperture at a closed end for slidably mating therein a shuttle plug movable into a locked-in-place pivot rod occluding position extending into said journalling aperture, wherein the conveyor belt structure further comprises means to block the open end of said blind shuttle cavity by structure on an adjoining link so that the shuttle plug cannot move out of the cavity during operation of the conveyor belt.

* * * * *